Aug. 24, 1948.  R. E. MARBURY ET AL  2,447,658
SHUNT CAPACITOR BANK

Filed Sept. 12, 1946  2 Sheets-Sheet 1

WITNESSES:

INVENTORS
Ralph E. Marbury, James B. Owens
and William H. Cuttino
BY
ATTORNEY

Patented Aug. 24, 1948

2,447,658

UNITED STATES PATENT OFFICE 2,447,658

SHUNT CAPACITOR BANK

Ralph E. Marbury, James B. Owens, and William H. Cuttino, Pittsburgh, Pa., assignors to Westinghouse Electric Corporation, East Pittsburgh, Pa., a corporation of Pennsylvania Application September 12, 1946, Serial No. 696,570

4 Claims. (Cl. 175—294)

The present invention relates to shunt capacitor banks for alternating-current transmission and distribution lines, and it relates more particularly to the protection of large, high-voltage, shunt capacitor banks against damage resulting from failure of individual capacitors.

Capacitors are frequently connected in shunt to alternating-current transmission and distribution lines, for the purpose of improving the power factor. When a relatively large amount of capacitance is required, the usual arrangement is to utilize the necessary number of relatively small capacitors, of standard kv.-a. and voltage ratings, connected together in a bank in a suitable series-parallel arrangement. This results in the most economical arrangement since it makes the most effective use of the dielectric material, and permits the use of standard capacitors of relatively low cost.

When a large number of capacitors is connected in a bank in this manner, the possibility of dielectric failure in one or more of the capacitors is always present, and if a faulted capacitor is not immediately removed from the circuit, the arc which occurs within the capacitor is likely to rupture the capacitor case, resulting in damage to adjacent good capacitors. For this reason, it is customary to provide an individual fuse connected in series with each capacitor, so that if a capacitor fails, its fuse will immediately blow and disconnect it from the bank.

In the usual arrangement of large, high-voltage capacitor banks, the capacitors are connected in groups, each group consisting of a plurality of capacitors connected in parallel, and a number of such groups is connected in series. If a fuse blows one one or more of the capacitors in one of these groups of paralleled capacitors, the impedance of that group is increased, and the voltage no longer divides equally among the series-connected groups, but increases on the group containing the faulted capacitor. Standard capacitors are designed for continuous operation at a voltage not exceeding 110% of the rated voltage, and if an overvoltage of more than 10% occurs on a group of capacitors because of failure of one or more of them, the remaining capacitors are endangered by the overvoltage. It is necessary, therefore, to provide some protective system which will prevent the capacitors from being subjected to a continuous overvoltage of more than 10%.

One protective system which has been used on three-phase capacitor banks utilizes potential transformers connected across each phase of the bank to measure the phase voltages, with the secondaries of the transformers connected to a relay in such a way that the relay responds to the zero-sequence voltage. As long as the phase impedances of the capacitor bank are equal, the zero-sequence voltage will be zero, and the relay will not be energized. If the impedances of the phases become unequal, due to failure of capacitors in one phase, the phase voltages are unbalanced, and the relay is operated by the zero-sequence voltage to trip the circuit breaker and disconnect the bank from the line.

In high-voltage capacitor banks, however, this system has a very serious practical limitation. The manufacturing tolerances for capacitance in standard capacitors are such that there is usually some slight difference in the impedance of the phases of a three-phase capacitor bank, and the sensitivity of the relay must, therefore, be such that it will not operate in response to the small amount of unbalance in the voltages resulting from this slight difference in phase impedances. Thus, there is a practical limit to the sensitivity of the relay. When a number of groups of parallel-connected capacitors are connected in series, however, there is a definite minimum number of capacitors in one group which must fail in order to cause the voltage across that group to rise by more than 10%. If the number of such groups in series is increased, this minimum number of capacitors in each group, which must fail to cause 10% overvoltage, decreases, while, at the same time, the minimum number of capacitor failures in one group that can be detected by a relay of practical sensitivity increases.

Thus, there is a limit to the number of capacitor groups in series that can safely be utilized, and it can be shown that, in general, if there are more than three groups of paralleled capacitors in series, a relay of practical sensitivity, responsive to zero-sequence voltage, cannot detect the failure of the smallest number of capacitors in one group which will cause a voltage rise of more than 10% on that group. In other words, if there are more than three groups of paralleled capacitors in series, the minimum number of capacitor failures in one group which will cause an overvoltage of more than 10% on that group is less than the minimum number of capacitor failures which can be detected by the relay. This is a serious disadvantage of this type of protective system for three-phase capacitor banks, and in very high voltage capacitor banks it has made it necessary either to leave the bank with inadequate protection, or else to use a lower voltage bank connected to the line through a transformer, with resulting higher cost of the installation and increased losses. Another disadvantage of this type of protection is that it is not applicable to single-phase capacitor banks.

The principal object of the present invention is to provide a high-voltage shunt capacitor bank which is adequately protected against overvoltage on any group of paralleled capacitors resulting from failure of one or more capacitors.

Another object of the invention is to provide means for protecting a high-voltage shunt capacitor bank against overvoltage on any group of parallel-connected capacitors, resulting from failure of one or more of the capacitors, the protective means being applicable to either single-phase or three-phase banks, and being applicable to banks which require any number of groups of standard capacitors in series to obtain the desired voltage rating.

A further object of the invention is to provide a high-voltage shunt capacitor bank which is protected against overvoltage on any group of parallel-connected capacitors by dividing the bank, or each phase of the bank, into two equal parallel-connected branches, and providing transformer means to compare the currents in the two branches and to actuate a relay in response to any substantial amount of unbalance in the currents. If the voltage to be applied to the capacitor bank is high enough to require more than three series-connected groups of capacitors, the bank is divided into the necessary number of larger groups of capacitors connected in series, the larger groups each having not more than three smaller groups of paralleled capacitors in series, and each of the larger groups having its own transformer and relay. In this way, adequate protection is provided for high-voltage capacitor banks without any limitation as to the number of capacitors that may be utilized in series.

Still another object of the invention is to provide a capacitor bank divided into two equal parallel branches, with transformer means for comparing the currents in the two branches and for energizing a relay in response to unbalance of the currents in the two branches, in which the transformer means is arranged so that no dangerous transient voltages occur when the capacitor bank is connected in parallel with another capacitor bank which is already energized.

The invention will be more fully understood from the following detailed description, taken in connection with the accompanying drawings, in which.

Figure 1:
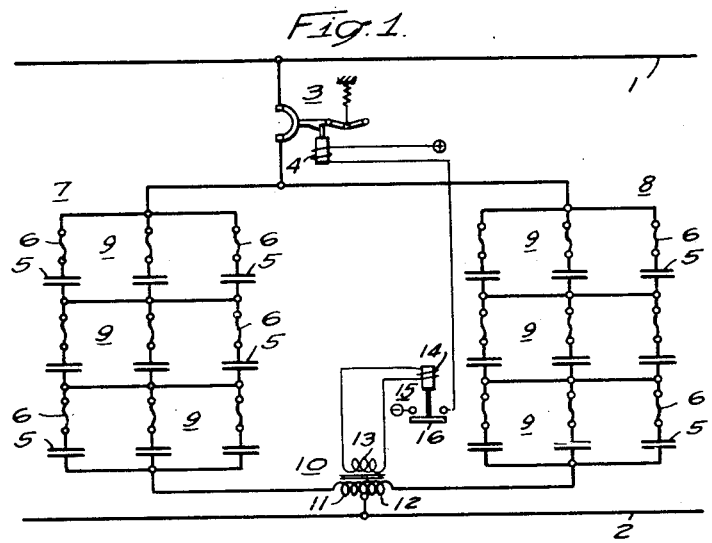
Figure 1 is a schematic diagram showing a capacitor bank embodying the invention.

Fig. 1 shows a shunt capacitor bank connected across conductors 1 and 2, which may be the line conductors of a single-phase transmission or distribution line, or which may be a phase conductor and neutral of a three-phase line. The capacitor bank is connected to the line 1 by means of a circuit breaker 3 of any suitable type, which is shown as having a trip coil 4, and which may be actuated to closed position manually, or in any other suitable manner.

The capacitor bank is made up of a suitable number of individual capacitor units 5, each of which has an individual fuse 6 connected in series with it. The capacitor bank is divided into two equal branches 7 and 8, which are connected together in parallel, and each of the branches 7 and 8 consists of a number of series-connected groups 9 of capacitors 5, each of the groups 9 consisting of a plurality of capacitors 5 connected in parallel. As shown in the drawing, each of the groups 9 comprises three capacitors 5, but it is to be understood that in an actual capacitor bank, there will usually be a relatively large number of capacitors connected in parallel in each of the groups 9, and preferably, there should be at least four capacitors in each group to obtain at least a four-to-one increase in the current through a faulted capacitor to insure positive blowing of its fuse 6. Each of the branches 7 and 8 of the capacitor bank, in the illustrated embodiment, includes three groups 9 of capacitors, connected in series.

The two branches 7 and 8 are exactly similar and are connected in parallel, one end of each branch being connected to the line 1 by the circuit breaker 3, and the other end of each branch being connected to the conductor 2 through the primary windings of a differential current transformer 10. The transformer 10 may be any suitable type of differential transformer, and is shown as having two differentially-related primary windings 11 and 12, connected in series with the branches 7 and 8, respectively. The transformer 10 has a single secondary winding 13, which is connected to energize the operating coil 14 of a relay 15. The relay 15 has normally open contacts 16, which are connected to energize the trip coil 4 of the circuit breaker 3 when the contacts 16 are closed.

It will be apparent that under normal conditions, the current through the capacitor bank will divide equally between the two parallel branches 7 and 8, since they are exactly similar and have the same impedance, except for the slight variation which may result from the slight differences in capacitance of individual capacitors. The currents flowing in the primary windings 11 and 12 of the differential current transformer 10 will, therefore, be balanced, and the voltage induced in the secondary winding 13 will be substantially zero, so that the relay 15 is not energized. If one or more of the parallel-connected capacitors in one of the groups 9 should fail, causing its fuse to blow and disconnect it from the bank, the impedance of that group will be increased, and the resultant impedance of the branch 7 or 8 in which it is connected will be changed, so that the currents in the two branches will no longer be equal. Thus, the currents in the primary windings of the transformer 10 are no longer balanced, and a voltage is induced in the secondary winding 13 which energizes the relay 15, causing it to close its contacts 16 and trip the circuit breaker 3 to disconnect the capacitor bank from the line.

It will be apparent that a protective system is thus provided which is applicable to either single-phase capacitor banks or three-phase capacitor banks. By dividing the bank, or each phase of a three-phase bank, into two equal parallel branches, a simple and relatively inexpensive differential transformer 10 may be utilized to compare the currents in the two branches and to energize a relay in response to any substantial unbalance in the currents, which indicates that one or more capacitors have failed, with a corresponding increase in voltage on the remaining capacitors in the same group.

Instead of the differential transformer 10, two separate current transformers might be used, having their primaries connected in series with the parallel branches 7 and 8, respectively, and with their secondaries cross-connected to energize a relay in response to unbalance of the currents in the two branches. The use of a differential transformer, as shown in the drawings, is preferred, however, not only because of its lower cost, but also because of the avoidance of dangerous transient voltages when the capacitor bank is connected to the line. If a capacitor bank is connected in parallel with another capacitor bank which is already energized, as is often done, a relatively large transient current may flow between the two banks, and if separate transformers with cross-connected secondaries were used, this transient current would cause high transient voltages in the transformer secondaries which might damage the insulation of the transformers or the relay coil. With a single differential transformer, such as that shown in Fig. 1, however, these high transient currents are always balanced in the primary of the transformer and no dangerous voltages occur.

Figure 2:
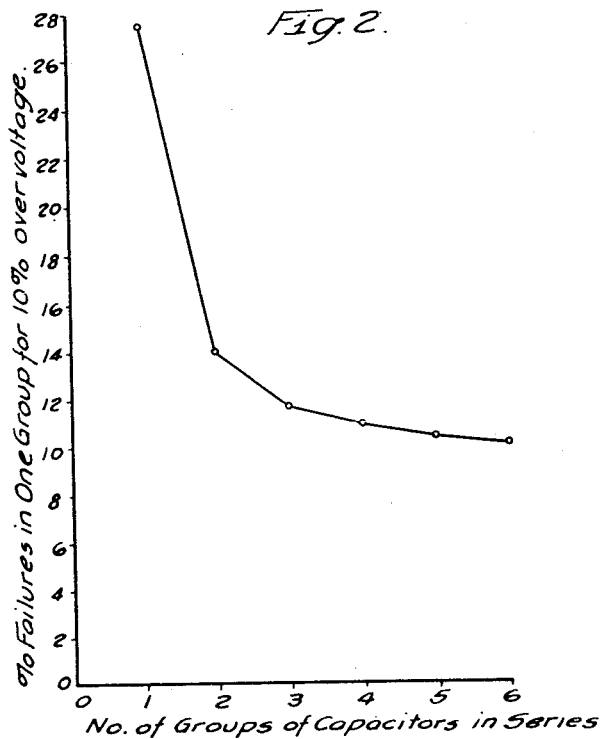
Fig. 2 is a curve showing certain relations in capacitor banks of this type.

The capacitor bank shown in Fig. 1 has three groups 9 of paralleled capacitors 5 in series in each branch. For higher voltages, it is frequently necessary or desirable to utilize more than three capacitors in series, in order to permit the use of relatively low-voltage standard capacitors. When the number of capacitors in series is increased, however, there is a limitation on the effectiveness of protection by a single relay. As explained above, there are slight differences in the capacitances of the individual capacitors, resulting in slight differences in the currents in the two parallel branches 7 and 8 under normal conditions, and the sensitivity of the relay 15 must, therefore, be such that it will not respond to this small unbalance prevailing under normal conditions. Thus, there is a practical limit to the sensitivity of the relay. As the number of groups of paralleled capacitors in series is increased, the number of capacitor failures in each group which will cause 10% overvoltage on the group decreases sharply. This is illustrated by the curve of Fig. 2, which is plotted for a three-phase star-connected capacitor bank having a number of groups of parallel-connected capacitors in series. It will be seen from this curve that as the number of groups of capacitors in series is increased, the percentage of capacitor failures in each group which will produce 10% overvoltage on that group rapidly decreases. At the same time, the minimum number of capacitor failures in a group of parallel-connected capacitors which can be detected by a relay of practical sensitivity increases as the number of groups of capacitors is increased.

It can be shown that for a relay of practical sensitivity, three groups of capacitors in series is the maximum number that can be utilized without permitting the risk of an overvoltage of more than 10% on one group of capacitors. In other words, if there are more than three groups of parallel-connected capacitors in series, the smallest number of capacitors in one group, failure of which will cause 10% overvoltage on that group, is less than the minimum number of capacitor failures in a group which can be detected by the relay. It is not safe, therefore, to use more than three groups of capacitors in series, either with the system shown in Fig. 1 and described above, or with the zero-sequence voltage-responsive-protective system of the prior art.

Figure 3:
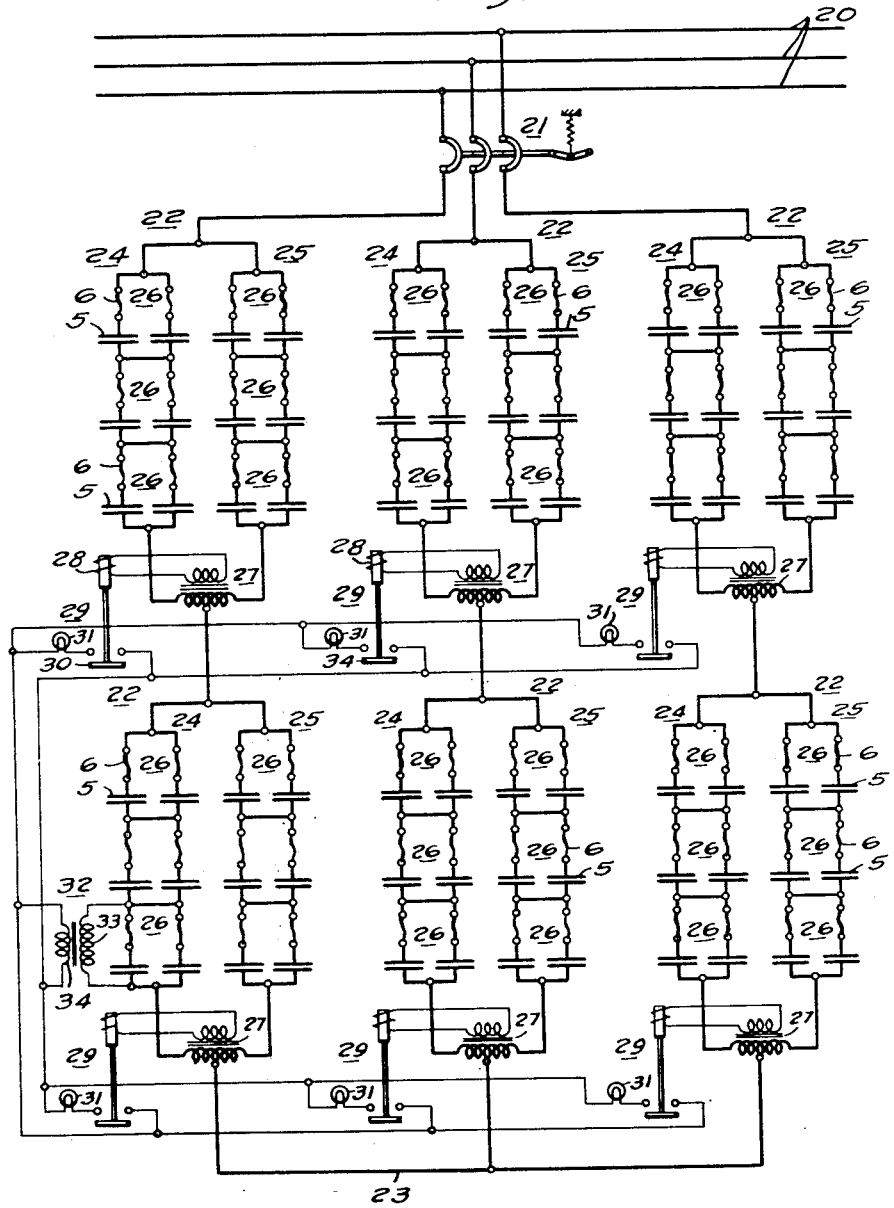
Fig. 3 is a schematic diagram showing a high-voltage, three-phase capacitor bank embodying the invention.

This practical limitation can readily be overcome, however, by the protective system of the present invention. Fig. 3 shows a high-voltage, three-phase capacitor bank intended for use on a voltage which is high enough to require the use of six standard capacitors in series. This is done in accordance with the present invention, without any sacrifice of protection for the bank, by dividing each phase into series-connected groups with not more than three smaller groups of capacitors in series in each group. Each group is divided into two parallel branches and has its own transformer and relay to respond to failure of capacitor units.

The capacitor bank shown in Fig. 3 is connected in shunt to a three-phase circuit 20 by means of a circuit breaker 21, which may be controlled in any suitable manner. Each phase of the capacitor bank consists of two groups 22 of capacitors 5, the groups being connected together in series between the three-phase line 20 and a neutral connection 23. Each of the groups 22 is similar to the capacitor bank of Fig. 1 and is divided into two similar parallel branches 24 and 25. Each of the branches 24 and 25 of each group 22 consists of three series-connected smaller groups or sub-groups 26, each consisting of a suitable number of capacitors 5 connected in parallel. It will be understood that any suitable number of capacitors is connected in parallel in each of the sub-groups 26, and a relatively large number of capacitors will usually be used in each sub-group to obtain the necessary kv.-a. capacity for the bank.

The two branches 24 and 25 of each group 22 are connected to a differential current transformer 27, similar to the transformer 10 of Fig. 1, which is connected to energize the operating coil 28 of a relay 29, which has normally open contacts 30. All of the groups 22 are identical and each phase of the capacitor bank, in the illustrated embodiment, consists of two such groups connected in series between one of the conductors of the line 20 and the neutral connection 23. The relays 29 may be connected to effect any desired response to overvoltage on one sub-group of capacitors. As shown in Fig. 3, the relays 29 are conected to energize signal lamps 31 to give an indication of the presence of faulted units in the particular groups with which they are associated. Energy for the lamps 31 may be obtained from the voltage across one of the sub-groups 26 by means of a transformer 32, having its primary winding 33 connected across one of the sub-groups 26. Each of the lamps 31 is connected, in series with the contacts 30 of its corresponding relay 29, across the secondary winding 34 of the transformer 32. Energy for the lamps 31 may also be obtained from any other suitable source, if available, instead of the transformer 32.

The operation of the protective means shown in Fig. 3 will be apparent. In case of failure of a number of capacitors in any one of the sub-groups 26 in any of the groups 22, which would cause a 10% increase in voltage on the capacitors of that sub-group, the resulting unbalance in the currents in the primary windings of the differential transformer 27 of the group will cause operation of the corresponding relay 29 to close its contacts 30 and cause the lamp 31 to light, indicating the occurrence of the overvoltage.

It will be apparent, of course, that the relays 29 might be connected to trip the breaker 21, in the manner shown in Fig. 1, or they might be utilized to effect any other desired type of response.

It should now be apparent that means have been provided for protecting large, high-voltage capacitor banks against overvoltages resulting from failure of individual capacitors, which is not subject to the limitations inherent in the protective systems which have been used heretofore, and which makes it possible to design capacitor banks for any voltage desired, and to use as many capacitors of standard voltage rating in series as may be needed without any sacrifice of protection. Certain embodiments of the invention have been shown and described for the purpose of illustration, but it is to be understood that the invention is not limited to these specific arrangements, but in its broadest aspects, it includes all equivalent embodiments and modifications which come within the scope of the appended claims.

We claim as our invention:

1. A capacitor bank adapted to be connected in shunt to an alternating current line, said capacitor bank comprising a plurality of series-connected groups of capacitors, an individual fuse in series with each capacitor, each of said groups of capacitors consisting of two similar parallel-connected branches, and each branch of each group including not more than three sub-groups of capacitors connected in series, each of said sub-groups comprising a plurality of capacitors connected in parallel, and means for detecting any substantial unbalance in the currents in the two parallel branches of each group of capacitors.

2. A capacitor bank adapted to be connected in shunt to an alternating current line, said capacitor bank comprising a plurality of series-connected groups of capacitors, an individual fuse in series with each capacitor, each of said groups of capacitors consisting of two similar parallel-connected branches, and each branch of each group including not more than three sub-groups of capacitors connected in series, each of said sub-groups comprising a plurality of capacitors connected in parallel, and relay means for each group of capacitors adapted to respond to any substantial unbalance in the currents in the two parallel branches of the group.

3. A capacitor bank adapted to be connected in shunt to an alternating current line, said capacitor bank comprising a plurality of series-connected groups of capacitors, an individual fuse in series with each capacitor, each of said groups of capacitors consisting of two similar parallel-connected branches, and each branch of each group including not more than three sub-groups of capacitors connected in series, each of said sub-groups comprising a plurality of capacitors connected in parallel, current transformer means for each group of capacitors, and relay means for each group of capacitors, said relay means being energized by said current transformer means to respond to any substantial unbalance of the currents in the two parallel branches of the group of capacitors.

4. A capacitor bank adapted to be connected in shunt to an alternating current line, said capacitor bank comprising a plurality of series-connected groups of capacitors, an individual fuse in series with each capacitor, each of said groups of capacitors consisting of two similar parallel-connected branches, and each branch of each group including not more than three sub-groups of capacitors connected in series, each of said sub-groups comprising a plurality of capacitors connected in parallel, a differential current transformer for each group of capacitors, each of said current transformers having two differentially related primary windings, each primary winding being connected to carry the current of one of the two parallel branches of the group of capacitors, each current transformer also having a secondary winding, and a relay for each group of capacitors energized by the secondary winding of the current transformer, whereby the relay responds to any substantial unbalance of the currents in the two parallel branches of the group of capacitors.

RALPH E. MARBURY.
JAMES B. OWENS.
WILLIAM H. CUTTINO.

REFERENCES CITED

The following references are of record in the file of this patent:

UNITED STATES PATENTS

| Number | Name | Date |
| --- | --- | --- |
| 1,483,552 | Pickard | Feb. 12, 1924 |
| 1,823,328 | Marbury | Sept. 15, 1931 |
| 1,900,495 | Gay | Mar. 7, 1933 |
| 1,991,063 | Rudenberg | Feb. 12, 1935 |
| 2,125,077 | Marbury | July 26, 1938 |
| 2,349,611 | Buter | May 23, 1944 |